UNITED STATES PATENT OFFICE 2,242,017

HIGHER ALCOHOLS

Wilhelm Normann, Chemnitz, Germany, assignor to American Hyalsol Corporation, Wilmington, Del., a corporation of Delaware No Drawing. Application April 19, 1938, Serial No. 202,967. In Germany January 27, 1930

6 Claims. (Cl. 260—632)

This invention relates primarily to production of higher molecular aliphatic alcohols.

Prior to the present invention such alcohols were prepared by reducing lower alkyl esters of the corresponding organic acids by means of sodium and lower molecular aliphatic alcohols. Such process, however, is relatively expensive and poorly suited for use on a large commercial scale.

An object of the present invention is to provide higher molecular aliphatic alcohols, and in particular those having from eight carbon atoms upward, by a process which operates smoothly and produces such alcohols in a good yield at low cost. A secondary object of the invention is to provide a process for the production of mixtures of higher molecular alcohols and hydrocarbons.

Broadly considered, the objects of the present invention are accomplished by reducing higher molecular fatty acid radicals of fatty acid esters and other organic compounds containing such radicals, which radicals possess more than eight carbon atoms, by subjecting the same to the action of hydrogen and a hydrogenation catalyst under suitable conditions of temperature and pressure.

The preferred catalyst for the production of higher molecular alcohols, contains copper as an essential component, the same being producible by depositing finely divided metallic copper on a suitable carrier, for example, kieselguhr. Very good yields of such alcohols are obtained by causing hydrogen to act upon the corresponding fatty acid esters through the use of the copper catalyst at a temperature of from 300° to 400° C. under a pressure of 100 to 200 atmospheres.

Hydrogenation catalysts in general may be used in the instant reduction process with varying degrees of success. Some of such catalysts lead to high yields of higher molecular alcohols and some lead to the production of mixtures of alcohols and hydrocarbons in varying proportions. Even with the same catalyst, a variation in the temperature or the time of reaction will cause a variance in the relative proportions of the alcohols and hydrocarbons obtained in the reaction product. For example, when nickel, platinum and palladium are employed at the preferred temperature and pressure conditions stated, namely, at 300° to 400° C. and 100 to 200 atmospheres, products are obtained composed mostly of hydrocarbons but also containing a little alcohol. However, a sixty percent yield of higher molecular alcohols was obtained with nickel as the catalyst at a temperature of 250° to 260° C. at 500 atmospheres pressure when coconut oil was treated.

Other hydrogenation catalysts found particularly suitable for the production of alcohols include cobalt, zinc carbonate, a copper-chromium mixture and tin, cadmium, silver, and also their oxides and the oxides of zinc, chromium, magnesium and manganese.

Metallic copper is preferred in the reduction of the higher molecular fatty acid radicals to their corresponding alcohols for the reason that it possesses to the highest extent the ability to catalyze only the first step of the reduction process but not the further step of reduction into the hydrocarbon stage, with the result that it is now possible to obtain alcohols in nearly quantitative yields.

Although the temperature of 300° to 400° C. and pressure of 100 to 200 atmospheres are the best when copper is employed as the catalyst, lower as well as higher temperatures and pressures can be used, but if such are employed lesser yields of alcohols are obtained. Although the conditions most suitable for copper are utilizable for other catalysts, conditions within a range of temperature from about 200° C. up or from 200° to 450° C. and a range of pressure of about 60 atmospheres up to 500 atmospheres or more, if the apparatus will stand such, are operable for the hydrogenation catalysts as a class.

The instant invention is independent of the method by which the contact between the organic compounds to be reduced, the hydrogen and the catalyst is obtained so long as the temperature and pressure conditions disclosed are employed. The contact between the catalyst and the compounds may be effected by ordinary mixing, or the compounds may be flowed past the catalyst held in a stationary position.

Example 1

The ethyl ester of lauric acid is mixed with such amount of a copper catalyst that the weight of the copper present is 2% of the weight of the ester. Hydrogen is allowed to act on the mixture in a closed reaction vessel, at a pressure of about 100–200 atmospheres and at a temperature of about 350° C. The normal primary alcohol $C_{12}H_{25}OH$ (lauryl alcohol) is obtained with a smoothly proceeding reaction resulting in a very good yield.

It is also possible to use, instead of the ethyl ester of lauric acid, the ester mixture which results upon esterifying all the fatty acids of coconut fat with ethyl alcohol or some other lower aliphatic alcohol. When the mixture of ethyl esters is employed, the fraction boiling between 255° and 275° C. is used. The esters of other higher fatty acids with univalent alcohols, as well as the corresponding polyvalent or glycerine esters may also be processed in an analogous way. Thus the conversion of the naturally occurring fatty acid glycerides into other esters may be eliminated and the mixtures of glycerides or individual glycerides isolated therefrom may be subjected to the reduction in the manner described. The invention being applicable to the treatment of the alkyl esters and glycerides of any of the fatty acids contained in cocoanut oil, includes the reduction of the fatty acid radicals of lauric acid, myristic acid, palmitic acid and stearic acid each of which is contained in cocoanut oil in varying amounts. Commerical grades of cocoanut oil contain varying amounts of free fatty acids, generally from 5 to 10% or more and in grades used for soap making purposes, the amount has been found in a large number of samples to run as high as 25% free fatty acids. Alcohols in good yields are obtained by catalytically reducing the fatty acid radicals in such materials. The reduction process has been found to reduce all of these mixed acids, esters and glycerides substantially quantitatively to alcohols.

The alcohols resulting from the reduction of cocoanut oil or mixtures of esters obtained therefrom possess the general formula $C_nH_{2n+1}OH$, such alcohols corresponding in number of carbon atoms to the fatty acid radicals of the mixture treated.

Example 2

Cocoanut oil is mixed with a cobalt catalyst supported upon kieselguhr and the mixture subjected to the action of hydrogen at a temperature of about 285° C. under a pressure of about 250 atmospheres. The product contains a mixture of saturated higher molecular aliphatic alcohols corresponding to the fatty acids of cocoanut oil.

The products obtained may be used for many commercial purposes, for example in the various branches of the art of textile improvement, and may be employed without further refining or separation. They are in particular excellently suitable for making sulfonation products, because, even if they do not contain 100% of alcohols, yet they do contain nearly 100% of sulfonatable constituents, which may include also the admixed unsaturated compounds.

This application is a continuation in part of applicant's co-pending applications, Serial No. 510,326, filed January 21, 1931, now Patent No. 2,241,416 dated May 13, 1941 and Serial No. 656,197, filed February 10, 1933.

I claim:

1. A mixture of higher molecular alcohols of the general formula $C_nH_{2n+1}OH$ corresponding to fatty acid radicals of cocoanut oil in number of carbon atoms.

2. A mixture of higher molecular alcohols of the general formula $C_nH_{2n+1}OH$ corresponding to fatty acid radicals of a mixture of ethyl esters of fatty acids of cocoanut oil boiling between about 255° and 275° C.

3. As a new composition of matter, a mixture containing essentially alcohols having from 8 to 16 carbon atoms, said alcohols corresponding in the number of carbon atoms to the acid radicals contained in cocoanut oil.

4. A mixture of higher molecular alcohols substantially wholly of the general formula $C_nH_{2n+1}OH$ obtained by the catalytic hydrogenation of the fatty acid radicals of cocoanut oil by treatment of the same at an elevated temperature and pressure in the presence of hydrogen and a hydrogenation catalyst capable of reducing esters of higher molecular fatty acids to the corresponding alcohols.

5. A mixture containing essentially normal primary alcohols having from 8 to 16 carbon atoms obtained by the catalytic reduction of the fatty acid radicals of cocoanut oil at temperatures above 200° C. under superatmospheric pressure in the presence of hydrogen and a hydrogenation catalyst capable of reducing esters of higher molecular fatty acids to the corresponding alcohols.

6. As a new composition of matter, a mixture of higher aliphatic alcohols having at least 8 carbon atoms in the molecules derived by the catalytic hydrogenation of a selected fraction of naturally occurring mixtures of fatty acid radicals.

WILHELM NORMANN.